United States Patent [19]

Barbieri

[11] 4,189,227
[45] Feb. 19, 1980

[54] ILLUMINATING SYSTEM FOR PHOTOGRAPHIC COLOR ENLARGEMENT OR COPYING

[75] Inventor: Siegfried Barbieri, Brixen, Italy

[73] Assignee: Durst AG Fabrik Fototechnischer Apparate, Bozen, Italy

[21] Appl. No.: 934,697

[22] Filed: Aug. 17, 1978

[30] Foreign Application Priority Data

Sep. 20, 1977 [IT] Italy .................................. 4853 A/77

[51] Int. Cl.² ............................................... G03B 27/76
[52] U.S. Cl. ........................................... 355/35; 355/88
[58] Field of Search ................................ 355/32, 35, 88

[56] References Cited

U.S. PATENT DOCUMENTS

| 3,784,377 | 1/1974 | Levy et al. | 355/35 |
| 3,797,933 | 3/1974 | Sable | 355/35 |
| 3,836,246 | 9/1974 | Bowker | 355/32 |
| 3,982,825 | 9/1976 | Mitchell | 355/35 X |
| 4,050,807 | 9/1977 | Barbieri | 355/32 |
| 4,087,174 | 5/1978 | Nishikawa | 355/32 |
| 4,101,216 | 7/1978 | Grossmann | 355/35 |

Primary Examiner—Richard A. Wintercorn
Attorney, Agent, or Firm—Cahill, Sutton & Thomas

[57] ABSTRACT

An illuminating system is provided with a source of light for generating a beam of light having a ratio of energy distribution at three wave length ranges that differ from the spectral sensitivity of photographic copying material at those three wave length ranges. Color filters are inserted into the beam of light to a depth for compensating for the disparity between the energy distribution and spectral sensitivity. One of the filters is of a filter color that influences the wave length ranges having the highest energy levels in excess of a desired energy; a second filter of a second filter color influences only the wave length range with the largest energy excess over the desired energy level.

8 Claims, 4 Drawing Figures

ILLUMINATING SYSTEM FOR PHOTOGRAPHIC COLOR ENLARGEMENT OR COPYING

The present invention pertains to illuminating systems for photograhic color enlargement or copying.

In prior art illuminating systems (also known as color mixing heads), the proportion of the three primary colors of the copying lamp may be varied continuously in a certain range by inserting three filters in the optical path of an essentially white source. These filters are separately adjustable to subtract two of the primary colors. The ratio of the primary color components that strike the material to be copied is determined by the dept of insertion of the individual filters.

In the past, it was not possible to adjust the color absorption characteristics of these filters so that they exactly agreed with the sensitivity curves of the photographic material used for enlarging or copying. Typical filters incorporate so-called side densities, that is, they affect to a certain degree light of a wave length corresponding to one or two sensitivity ranges adjacent to the wave length corresponding to the filter color selected for the sensitivity range of the photographic copying material. Consequently, a change in the insertion depth of a primary color filter also affects one or two adjacent primary colors. Currently available color mixing heads use dichroic filters which are excellent in long term constancy of filter characteristics, but are very expensive.

It is therefore an object of the present invention to provide an inexpensive illuminating system wherein the variation of a filter value will affect principally only the sensitivity range of the copying material corresponding to the particular filter color.

The invention is based on the fact that typical light sources used for color copying have excess radiating energy in the blue and green region compared to the red region. The excess blue energy in turn is larger than the green one. This relationship is caused by pecularities of the light sources used for copying purposes as well as the characteristics of the photographic material, the negatives to be copied and the type of lens used for copying. For a certain combination of color negative, enlarging lens and copying paper, it has been calculated that an ideal light source should have a spectrum of 420 to 490 nm for blue, 510 to 570 nm for green and 590 to 750 nm for red, and the energy levels should have the ratio of 2.56 to 10.2 to 100, respectively, in order to achieve the proper balance in a color copy. This calculation is based on the spectral sensitivity of the copying paper and the transmissivity of the color negative and objective lens.

Typical light sources, such as quartz-halogen lamps, radiate energy in the spectral regions mentioned above in the ratio of 10:20:100. In typical useage of a color mixing head the result is that only the position of the yellow and of the purple filter has to be changed while the blue-green filter remains constant or is not inserted into the optical path at all because it would affect only the red portion of the light and increase the exposure time. Different light sources might be considered, where the excess energy falls into a region other than blue and green. To reduce the cost of the illuminating system, the present invention eliminates the continuously adjustable filter in a basic color when there is no excess of radiating energy in that color. The invention also incorporates the useage of absorption type filters rather than bandpass filters. Absorption type filters have a very steep filter curve which blocks shorter wave lengths and passes longer wave lengths in nearly ideal fashion. Such filters are easily manufactured by coloring glass or plastic materials.

At present the best filters for color copying purposes are a yellow and a red filter. The yellow filter has a high density in the blue region of copying paper and only small side densities in the green and red regions. The red filter has a high density in the blue and green regions and only small side densities in the red. By using those two filters, it is readily possible to adjust the color balance in simple fashion without having to repeat these adjustments several times as is required with presently available color mixing loads which use filters with side densities. The use of the red and yellow filters is possible because the excess of spectral emission of the light source is greater in the blue region than in the green region. Should the excess ratio be different in only that the conditions mentioned above are not true, then it is possible to add correcting filters in the blue-green and purple regions in a separate filter plane to restore the required conditions outlined above.

The present invention may more readily be described by reference to the accompanying drawings in which.

Figure 2:
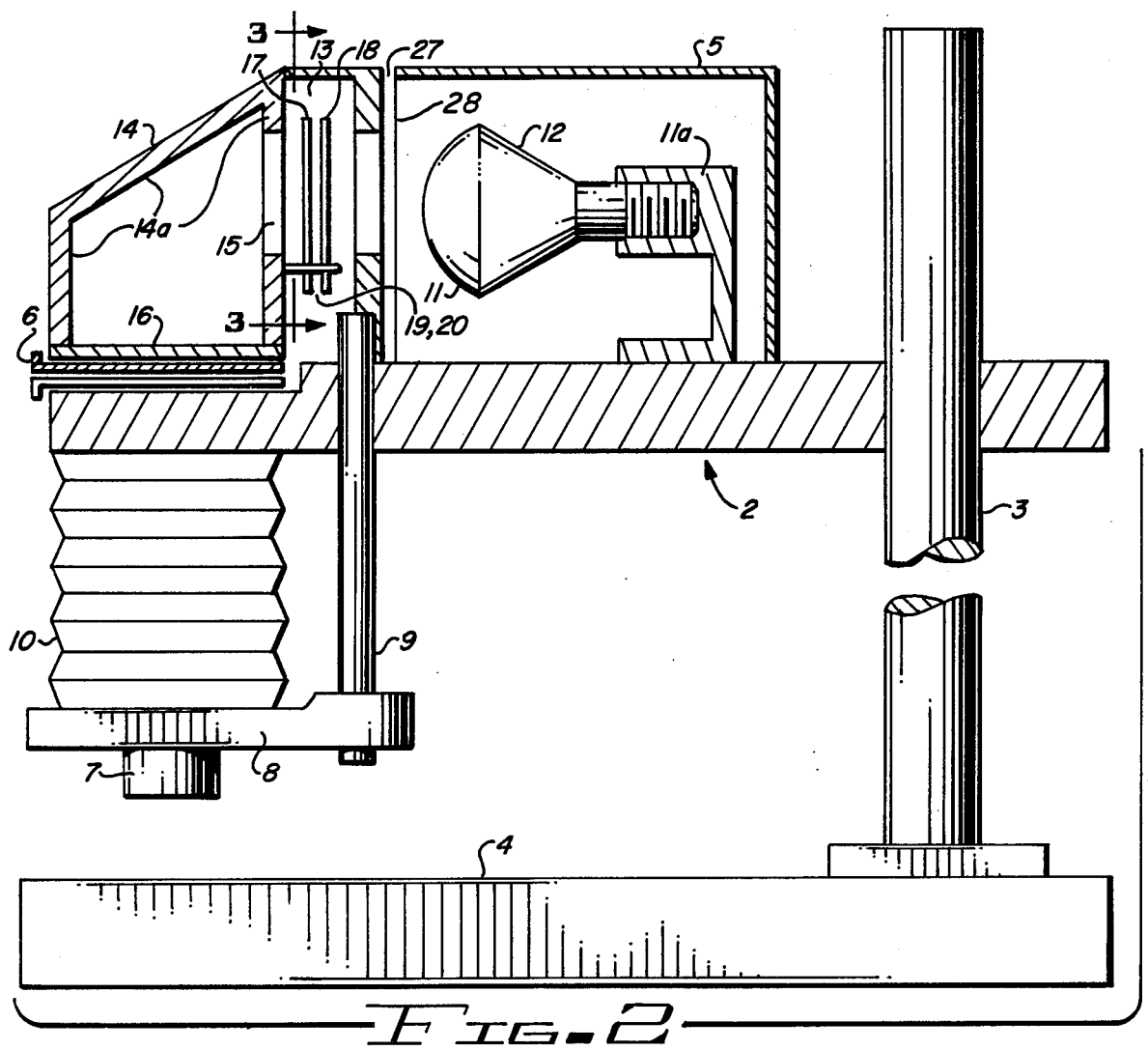
FIG. 2 is a cross-section of an illuminating system in a photographic enlarger based on the invention.

Referring to FIG. 2, the illuminating system of the present invention is a part of head 2 of a photographic enlarger, which includes: support column 3, support plate 4, negative holder 6 and objective lens 7. Head 2 is movable along support column 3 by a mechanism (not shown) in order to set the amount of enlargement. Objective lens 7 is mounted on the objective plate 8, which can be adjusted along the column 9 for focusing purposes by a mechanism not shown. Between the object lens 7 and the negative holder 6 is located an expandable, light proof bag 10. The illuminating system includes three main parts: a lamp housing 5 which contains reflector 12, lamp 11 in socket 11a, a filter unit 13 which is described below, and a light mixing chamber 14 with reflective walls 14a, a light entrance and a diffusion plate 16 adjacent to the negative holder 6.

Figure 3:
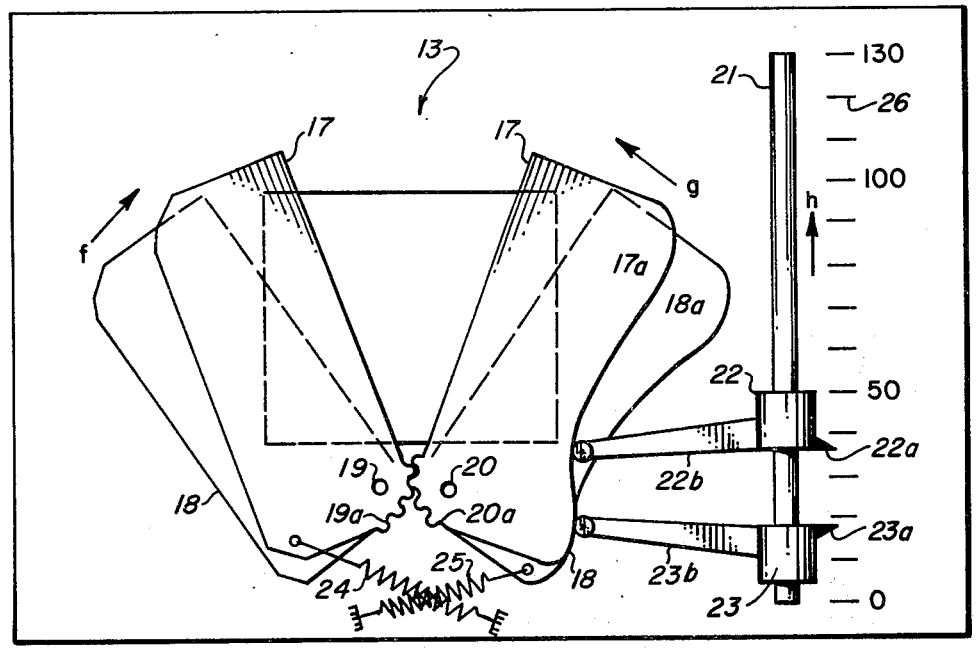
FIG. 3 is a cross sectional view of a portion of FIG. 2 taken along line 2—2 showing the filter unit incorporated in the system.

Referring now to FIG. 3, the filter unit 13 consists of two filter pairs 17 and 18 in the filter colors yellow and red which are movable in the direction of the arrows f and g into the optical path of the light source 11 which radiates essentially white light. The spectral characteristic of the filters modifies the light in the affected cross-section of the radiating light. After the filter unit 13 the light contains unmixed color (dependent on the position of filter pairs 17 and 18) and enters into the light mixing chamber 14 via the light entrance 15. The light is mixed intensively by multiple reflections on diffusely reflecting walls 14a, proceeds through diffusion plate 16, through the negative holder 6, the objective lens 7 to the copying paper located on the support plate 4.

The filter pairs 17 and 18 are located one after the other. Each individual filter pair is movable around pivots 19 and 20 and can be inserted into the light beam in such a fashion that the light is affected by the individual filters of each filter pair in identical fashion on two different sides. For this purpose, both filters are connected by gears 19a and 10a. Adjustable levers 22 and 23 move in the directions indicated by arrow h and carry indicators 22a and 23a, and rods 22b and 23b. These rods contact the outer edge 17a and 18a of filters 17 and 18. Springs 24 and 25 guarantee continuous contact of the filter edges 17a and 18a with rods 22b and 23b.

Figure 1:
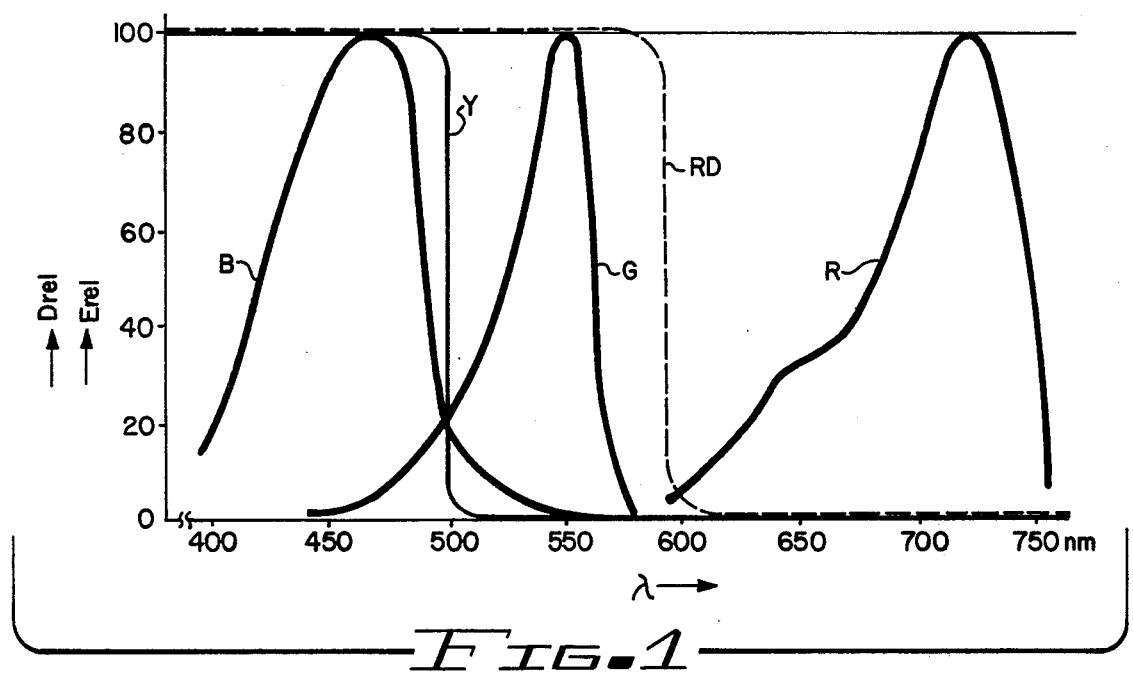
FIG. 1 is a diagram showing the relative sensitivity $E_{rel}$ of copying paper and the relative density $D_{rel}$ of color filters as a function of wave length (lambda).

Typically, the filter pair 17 has the relative spectral density $D_{rel}$ per curve Y in FIG. 1, and the filter pair 18 is characterized by curve RD. The curves B, G and R in FIG. 1 show the relative spectral sensitivity $E_{rel}$ of the blue, green and red sensitive emulsion in the copying paper. As can be seen from FIG. 1, filter pair 17 affects the blue sensitive emulsion and filter pair 18 both the blue and green sensitive emulsion. An independent adjustment for the green sensitive emulsion is therefore not possible.

Referring again to FIG. 3, the movement of the levers in the direction h is not parallel to the filter edges and consequently controls the amount of insertion of the filters. A movement toward the top of FIG. 3 results in decreased filtering and movement in the opposite direction reduces filtering. Indicators 22a and 23a can be read on scale 26 which is calibrated in numbers related to specific filter values, for example starting with 0. Higher numbers might relate to higher filter values and a deeper insertion of the filter into the light beam. For example, the filter value with an unaffected light beam would be zero, and with totally inserted filters, the filter value might be 130. The density of the individual filters is usually larger than 2 (logarithm units); their action is such that they can be considered practically opaque for the light spectrum corresponding to the blocked region of the filter. Therefore the filtering action is proportional to the ratio of the geometric area of the covered to the uncovered light beam in the light entrance 15. The scale 26 can be calibrated linearly. The values may be related to densitometric density values which can be multiplied for convenience by 100. The value 130 corresponds then to a density of 1.3. For an absolute calibration of the indicated filter values, filter edges 17a and 18a are not straight but follow a curve which can be computed or empirically determined.

In moving lever 23 (which controls the pair of red filter 28) toward increased filter values, lever 22 is also forced into the same direction. This causes a simultaneous indications for the filter color purple and yellow due to the described characteristic of filter pair 18 which controls the green and blue region in the example. The yellow filter pair 17 can be adjusted independently only from a starting position dependent on the position of red filter pair 18. Therefore it can affect only that portion of the light beam which is not covered by the red filter pair 18. The area of the light beam that is covered both by the red filter pair 18 and the yellow filter 17 is in practice not influenced by the latter since the red filter pair exhibits such a high density in the blue region (typically greater than 2) that the addition of other filters (such as yellow filters 17) produces an insignificant effect. For densities larger than 2 for the red filter, the influence of the yellow filter remains below 1 percent. The filter unit 12 (FIG. 2) has a slot 27 and guides 28 which allow the insertion of additional filters into the light beam, such as blue-green or purple. This must be done as was explained above if, due to the characteristic of the film negative, the basic color components of the copying lamp are changed in a way that the blue and/or green component of the copying light show no excess energy compared to the case for ideal light components, the ratio of which was previously discussed. The need for adding a purple filter is determined in practical useage if even though the lever for the yellow filter indicates the same value as the lever for the purple filter, a satisfactory color balance cannot be achieved. The need for adding a blue-green filter is determined if either the lever for the yellow filter or for the purple filter must be set to zero while the color balance remains unsatisfactory. The necessity for such additional filters is extremely rare and for the great majority of color negatives a color balance is easily achieved by adjusting levers 22 and 23.

The filters described in this example apply for the case where the blue and green components of the copying light show an excess energy above the ideal ratios, and where the blue component is larger than the green one. These conditions are determined by the characteristics of the light source 11. Other light sources are possible where different color components are radiated in excess. In such a case it is only necessary to redesign the filter pairs 17 and 18 to fit the different conditions.

Figure 4:
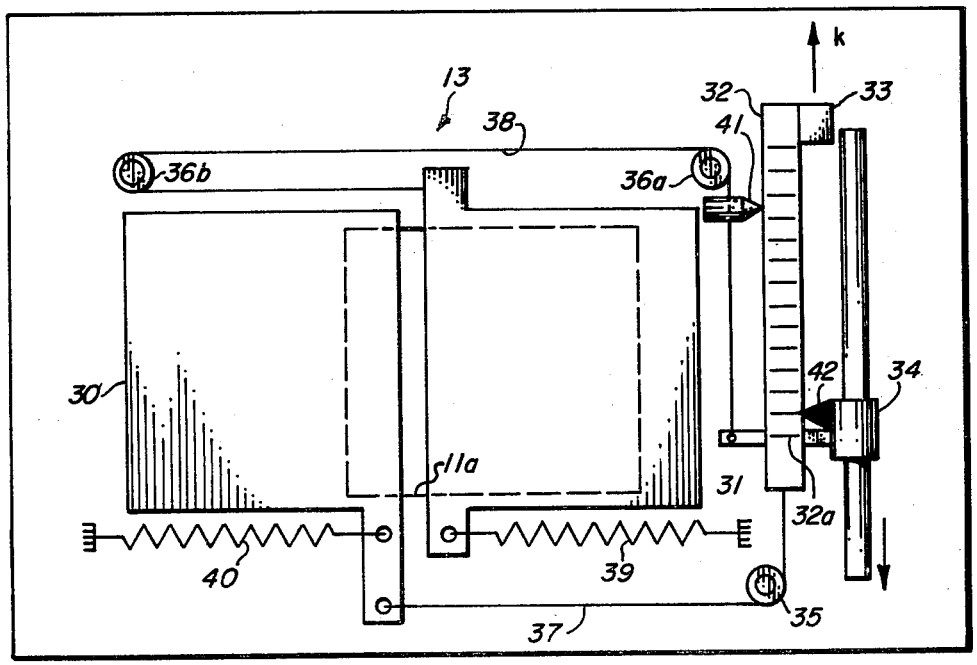
FIG. 4 shows an alternative filter unit that may be used instead of the filter unit of FIG. 3.

FIG. 4 shows an alternative working filter unit 13. Red filter 30 with a characteristic curve RD (FIG. 1) and yellow filter 31 with a caharacteristic curve Y (FIG. 1) can be inserted into the light beam from opposing sides. The position of red filter 30 is determined by the motion of movable lever 33 which is directly connected to a rod 32 carrying scale 32a attached to it. The position of yellow filter 31 is determined by movable lever 34. The movement of both levers 33 and 34 controls the filters 30 and 31 via pulleys 35, 36a and 36b and pull cords 37 and 38. The filters in turn are connected to the housing of filter unit 13 by restoring springs 39 and 40. A fixed indicator 41 is provided, and an indicator 42 is coupled to movable lever 34. Conveniently, two columns of numbers (not shown) may be used with the scale. For example, the calibration numbers working with fixed indicator 41 might correspond to purple filter values, and similary, the calibration numbers for indicator 42 correspond to yellow filter values. In FIG. 4, the movement of movable lever 33 in the direction of arrow k inserts the red filter 30 into the light beam and the movement of movable lever 34 in the direction of arrow i inserts the yellow filter 31 into the light beam. The filters 30 and 31 are moved parallelly to the position shown in FIG. 4 within appropriate guides (not shown). The scale is marked in filter values starting with zero and increasing in the direction of arrow 8. The zero mark might fall on two different spots on the scale 32 for the different filters if this is required by the actual mechanism. By moving the movable lever 33 in the direction k, a larger filter value will be indicated for purple as well as yellow. This action is desirable for a red filter 30 with the characteristic curve RD for the reasons discussed above. The yellow filter 31 is controlled by movable lever 34 independent of the position of red filter 30 and without affecting the indication for purple on the scale. Analogous to the given working example discussed earlier, additional filters may be desirable in the blue-green and purple range for the reasons discussed.

The illumination system discussed may be used for copying transparent material as well as opaque material. In this case changes have to be made in the arrangement of lamp to material to be copied and objective lens. These changes are well known in copying machines for such materials and need not be discussed here.

What is claimed is:

1. An illuminating system for photographic color enlargement or color copying, having a source of light for generating a beam of light in which the ratio of the energy distribution at three wave length ranges does not agree with the spectral sensitivity of photographic copying material at said three wave length ranges, said light exhibiting a different energy excess at two such wave length ranges in relationship to the spectral sensitivities of the copying material at these wave length ranges, said illuminating system comprising: means for continuously changing the spectral energy distribution of the light by inserting filters in two colors into a portion of the light beam from the light source, one of said filters having a first filter color that influences both wave length ranges and another of said filters having a second filter color that influences only the wave length range with the larger excess energy of the two wave length ranges.

2. The illuminating system of claim 1, wherein said light source has a larger excess energy in the blue region and a smaller excess energy in the green region, based on the sensitivity or wave length ranges corresponding to the primary colors blue, green and red, and where the first filter color is red and the second filter color is yellow.

3. The illuminating system of claim 2, wherein the red filter has a density greater than 2.0 in the blue and green region.

4. The illuminating system of claims 1, 2 or 3 wherein said filters corresponding to the different colors are arranged so that the light beam passes through them sequentially, means for adjusting the depth of insertion into said light beam of the filter corresponding to the first filter color, and means responsive to such adjustment for providing the same adjustment to the depth of insertion into said light beam of the filter corresponding to the second filter color.

5. The illuminating system of claim 4, where for each filter color two filters are provided which may be rotated around pivots into the light beam from both sides.

6. The illuminating system of claim 5, where both filters corresponding to one filter color are coupled together at the corresponding pivot by intermeshing teeth.

7. The illuminating system of claims 1, 2 or 3, wherein the filters corresponding to different filter colors are introduced into the light beam from different sides, means for adjusting the depth of insertion, into said light beam, of the filter corresponding to the first filter color, said means connected to a moving scale; second means for adjusting the depth of insertion, into said light beam, of the filter corresponding to the second filter color, said second means connected to an indicator; said indicator indicating marks provided on said scale.

8. The illuminating system of claims 1, 2 or 3 wherein said filters are absorption type filters made of colored plastic.

* * * * *